United States Patent
Lunt

[15] 3,682,490
[45] Aug. 8, 1972

[54] STEM OR SHAFT SEAL
[72] Inventor: William G. Lunt, Monroeville, Pa.
[73] Assignee: Rockwell Manufacturing Company, Pittsburgh, Pa.
[22] Filed: Aug. 24, 1970
[21] Appl. No.: 66,400

[52] U.S. Cl. ................... 277/102, 277/105, 277/171, 277/212 R, 251/214
[51] Int. Cl. .......................................... B65d 53/06
[58] Field of Search ...... 251/213, 214, 215, 266, 277, 251/278; 277/102, 105, 171, 212 R, 205

[56] References Cited

UNITED STATES PATENTS

| | | | |
|---|---|---|---|
| 963,230 | 7/1910 | Libby | 251/266 |
| 2,567,527 | 9/1951 | Parks | 251/214 X |
| 2,643,147 | 6/1953 | Funkhouser et al. | 277/102 X |
| 2,765,185 | 10/1956 | Mott | 251/214 X |
| 2,872,220 | 2/1959 | Payne | 277/102 X |
| 2,982,296 | 5/1961 | Ohls et al. | 251/214 X |

*Primary Examiner*—M. Cary Nelson
*Assistant Examiner*—David R. Matthews
*Attorney*—Strauch, Nolan, Neale, Nies and Kurz

[57] ABSTRACT

A rotatable valve stem or like shaft extending through an opening in a stationary part such as a valve body wall is surrounded by an integral relatively thin-walled tubular plastic seal element that due to its forming under axial compression in a die incorporates an expanded circumferential hoop stress region tending to increase the seal around the shaft. The element is axially biased toward a zone of sealing engagement with the stationary part around the opening.

9 Claims, 8 Drawing Figures

PATENTED AUG 8 1972
3,682,490
SHEET 1 OF 2
FIG.1
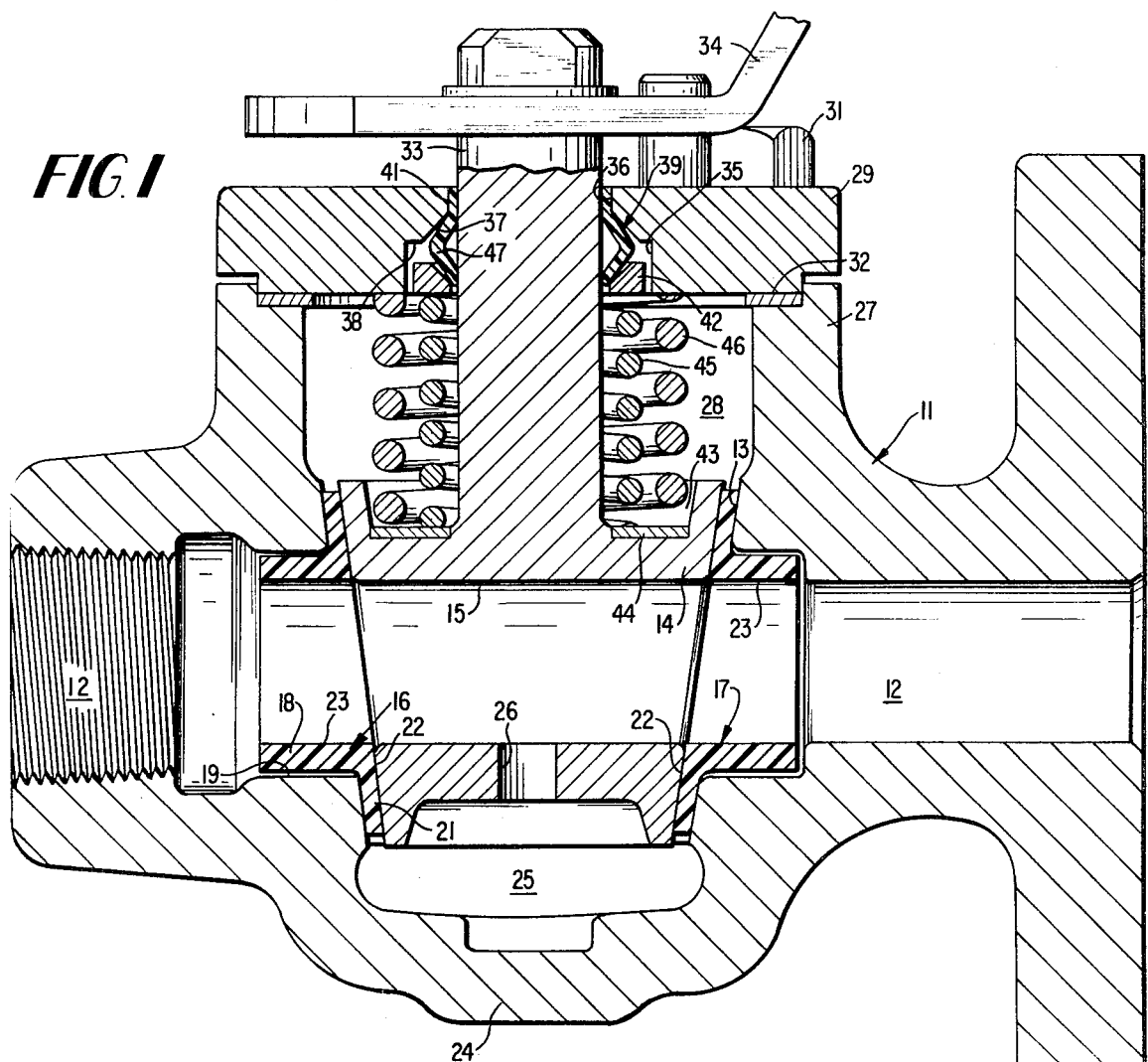
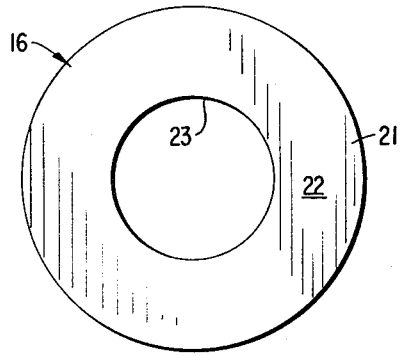
FIG.2
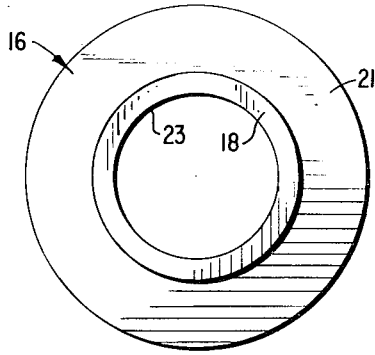
FIG.3
INVENTOR.
WILLIAM G. LUNT
BY
Strauch, Nolan, Neale, Nies & Kurz
ATTORNEYS

PATENTED AUG 8 1972
3,682,490
SHEET 2 OF 2
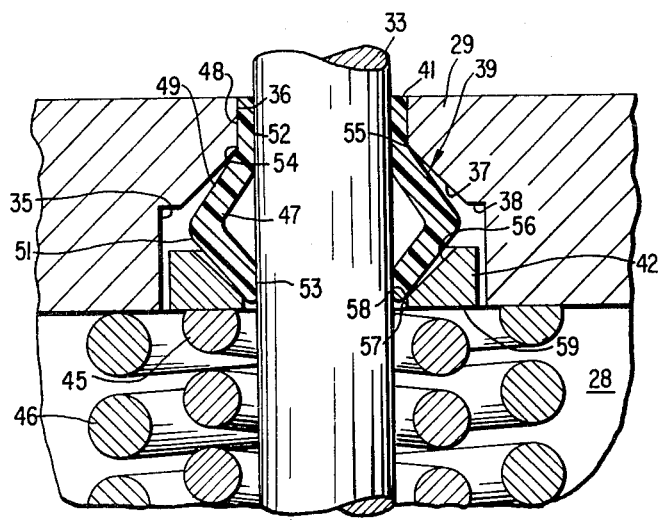
FIG. 4
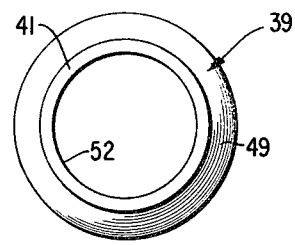
FIG. 5
FIG. 6
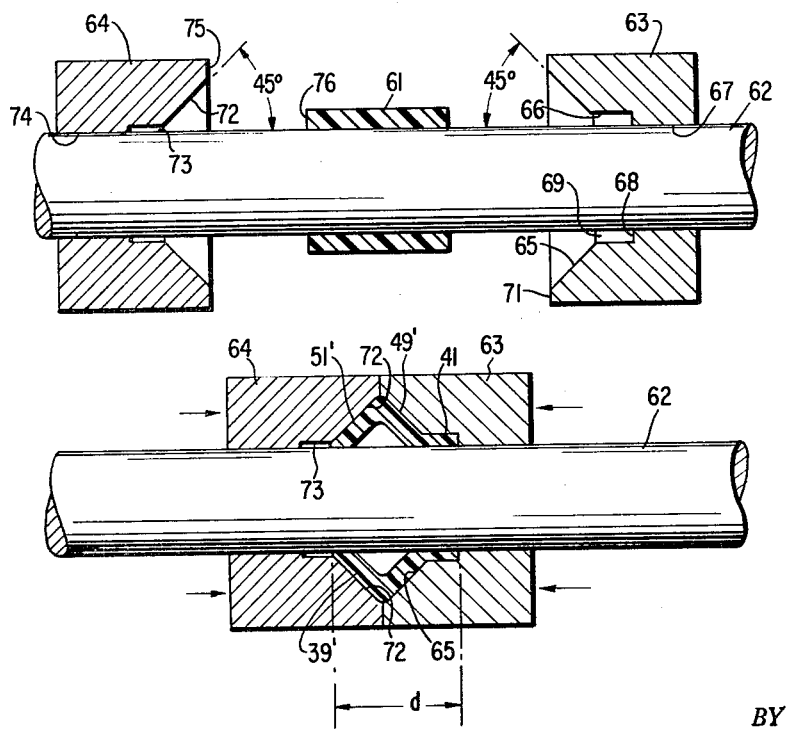
FIG. 7
FIG. 8
INVENTOR.
WILLIAM G. LUNT
BY
*Strauch, Nolan, Neale, Nies & Kurz*
ATTORNEYS 3,682,490

STEM OR SHAFT SEAL

BACKGROUND AND SUMMARY OF INVENTION

This invention relates to the sealing of a shaft extending rotatably or rockably through an opening in a valve, wall, housing or other member and particularly to such a seal that is exposed at one side to relatively high fluid pressure.

The efficient sealing of plug valve stems has long presented difficulties and many solutions have been proposed, none of them suitable to all conditions. In a valve the seal surrounds a stem or like shaft that is usually rotated through less than 180° at irregular intervals. The seal must be pressure tight to prevent escape of the fluid being valved, but must permit ready rotation of the shaft at any time. The seal must be capable of long life and it should be replaceable even by a non-skilled person in the field.

Prior attempts at solution of the problem have mainly resulted in the provision of compressible packings around the stem, some axially resiliently biased, but a common problem with most of these packings has been that they become more solid and less efficient and subject to wear with age. The present invention provides a novel seal that is inexpensive to make, install and replace and includes automatic compensation for normal wear over a long life.

In the preferred embodiment an integral tubular seal element surrounds a relatively rotatable valve stem portion extending through an opening in a valve body cover, and it has an annular smooth inner surface area closely surrounding a cylindrical surface of the valve stem. The seal element is of such construction and characteristics that it contains built-in circumferential hoop stresses that tend to increase the sealing pressure around the contacting surfaces of the stem and seal element, and the seal element is resiliently constantly axially biased to further increase that sealing pressure and also urge the seal element into sealing contact with the valve cover. Internally the valve stem extends through a body cavity that may contain fluid at various pressures including line pressure, and the fluid pressure in this cavity also acts axially of the seal element to increase its sealing pressures with both the stem and the valve cover. The seal element is preferably a one-piece die-formed member of a suitable synthetic plastic material such as polytetrafluoroethylene having the desired plastic deformation and resilient characteristics, as well as being impervious to fluid and inert with respect to water and the line fluids.

It is the major object of this invention to provide a novel seal assembly for a rotatable shaft wherein a deformable resiliently expandible and contractable seal element sealingly surrounds the shaft while permitting rotation thereof and is axially biased by resilient means and fluid pressure into increased sealing engagement with the shaft and a surrounding relatively stationary part. Attendant major objects of the invention lie in a novel method of making the seal element from tubular synthetic plastic stock, and the resultant special construction seal element made by the method.

It is a further object of the invention to provide a novel valve assembly wherein a rotatable valve stem extending through an opening in a body wall and an integral tubular seal element of synthetic plastic smoothly surrounds the stem and is formed with an annular region containing built-in hoop stresses tending to contract the seal element about the stem and is axially urged by fluid pressure within the body into increased sealing contact with the stem and the body wall.

Another object of the invention related to the foregoing comprises a novel seal element for use in the assembly that is radially expanded at the annular stress region and adapted to smoothly engage the stem at opposite ends of that region.

A further object of the invention is to provide a novel valve assembly wherein a valve plug stem is sealingly surrounded by a deformable tubular relatively thin-walled seal element of synthetic plastic preformed with an annular hoop stress region having intersecting outer surfaces each at an acute angle to the seal axis axially confined between similar opposed surfaces inclined at larger acute angles to the seal axis, one of said opposed surfaces being relatively stationary and the other opposed surface being resiliently biased toward the relatively stationary surface axially of the seal element.

Another object of the invention is to provide a novel integral seal element made of a relatively thin-walled synthetic plastic such as polytetrafluoroethylene having an expanded portion intermediate its ends wherein adjacent intersecting wall sections are angularly related and wherein internal smooth shaft contacting surfaces are provided at opposite ends.

A further object of the invention lies in a novel method of making such a tubular seal element wherein a uniform diameter length of plastic tubing is axially compressed between dies having opposed inclined annular forming faces against which an intermediate portion of the tube expands in plastic deformation to provide an annular seal portion having built-in hoop stresses that, when the formed seal element is released from the dies, tends to axially elongate and radially contract the seal element to a degree limited by the plastic deformation imparted during the die forming operation. Further objects of the invention will appear as the description proceeds in connection with the appended claims and the annexed drawings.

BRIEF DESCRIPTION OF DRAWINGS

FIG. 1 is central sectional view showing a valve assembly according to a preferred embodiment of the invention;

FIG. 2 is an end elevation of one of the valve seats apart from the assembly;

FIG. 3 is an opposite end elevation of the valve seat of FIG. 2;

FIG. 4 is an enlarged fragmentary view in section showing the stem seal;

FIG. 5 is an end view of the stem seal element apart from the assembly;

FIG. 6 is a diametral section through the seal element of FIG. 5; and

FIGS. 7 and 8 are partly sectional views illustrating the preferred method of making the stem seal element according to the invention.

PREFERRED EMBODIMENTS

Referring to FIG. 1, the valve assembly comprises a body 11 having a through passage 12 intersecting a tapered bore 13. A tapered plug 14 having a through port 15 is rotatably mounted within bore 13, being supported therein by annular valve seat members 16 and 17. The seat members are identical molded integral elements of a smooth plastic material such as Teflon or Polyethylene.

Seat member 16 is shown in FIGS. 2 and 3 and comprises a cylindrical mounting portion 18 which, see FIG. 1, extends into an enlarged section 19 of passage 12 at the intersection of the latter with bore 13. At its inner end seat member 16 has an enlarged plug engaging portion 21 that has a plug contacting surface 22 which is inclined and suitably concave to fit snugly with the adjacent surface of plug 14. Seat 16 provides a smooth passage 23 that is about the same diameter as and a substantial continuation of passage 12. Plug port 15 is of the same diameter as passageways 23 and, when the plug has been turned to open valve condition as illustrated in FIG. 1, port 15 aligns with and becomes an essential continuation of the body and seat passages.

The smaller end of bore 13 is closed by an integral wall 24 of the body, a space 25 of larger diameter than the adjacent end of bore 13 being formed in the body. A central opening 26 in the plug places port 15 in continuous fluid communication with space 25. At the large end of bore 13, the body extends as an annular collar 27 surrounding a space 28 of larger diameter than the adjacent end of the bore. A transverse cover 29 extends across the end of collar 27, being secured to the body as by a series of bolts 31. A suitable seal gasket 32 is interposed between the cover and body collar.

Plug 14 has an integral constant diameter smooth surfaced cylindrical stem 33 that projects through space 28 and an opening in cover 29 externally of cover 29 where it mounts a suitable operating lever 34.

As illustrated the opening through cover 29 has a large diameter inner cylindrical wall section 35 and a coaxial smaller diameter outer cylindrical wall section 36. Between sections 35 and 36 the cover opening has an inclined conical coaxial wall section 37 that intersects section 36. An annular axially inwardly facing coaxial surface 38 which is disposed at right angles to the axis of the opening and the walls of sections 35 and 36 extends between the inner larger end of conical section 37 and inner section 35.

An annular steam seal element 39 is mounted in the cover opening with its outer end 41 surrounding stem 33 within the opening section 36 and its other end engaged by an annular thrust ring 42 that has material peripheral clearance with respect to both stem 33 and cover opening surface 35. As shown in FIG. 1, the plug may be formed with an annular top surface well 43 around stem 33, and an annular flat washer 44 is disposed in the bottom of the well. A seal biasing coil spring 45 surrounds stem 33 and is compressed between ring 42 and washer 44. A larger diameter plug seating coil spring 46 surrounds spring 45 and is compressed between cover 29 and washer 44.

FIGS. 5 and 6 show the formed relaxed seal element 39 apart from the assembly. It is an integral element of a suitable plastic such as polytetrafluoroethylene (Teflon) of novel structure and formed in a novel manner. It is mounted in novel combination in the valve assembly as will be described.

Referring to FIGS. 5 and 6, the element 39 is a hollow annulus that is cylindrical for a minor portion 41 of its length at one end and has an enlarged diameter substantially V-shaped cross section for an intermediate portion 47 of its length. As shown in FIG. 6, the seal element has in sequence a smooth cylindrical external surface 48, and outwardly inclined substantially conical smooth surface 49, and an inwardly inclined substantially conical smooth surface 51. At opposite ends seal element 39 has coaxial smooth cylindrical internal surfaces 52 and 53 of the same diameter that, as will appear, surround valve stem 33 in the assembly.

Surface 49, in a preferred embodiment, slopes at an angle of about 55° to a plane normal to the longitudinal axis of the element 39, and surface 51 slopes oppositely at the same angle. Thus surfaces 49 and 51 in this embodiment slope at 35° relative to surface 48 and the longitudinal axis of the element, and their included angle is about 110°. Preferably, except for cylindrical end portion 41, element 39 has about the same radial wall thickness throughout its length, although this may vary somewhat at the apex of expanded seal portion 47 and at the intersection of surface 51 and 53 due to the novel process of forming to be later described. End portion 41 is of reduced radial wall thickness as shown, to resist extrusion of the element through the cover opening.

FIG. 4 shows the seal element 39 in operative assembly in a plug valve. The longitudinal extent of cylindrical surface 48 is preferably at least equal to that of surface 36 of the cover opening, and in the assembly the substantially annular linear juncture 54 between surfaces 48 and 49 engages the annular juncture 55 of cover surfaces 36 and 37 to provide a continuous seal with the cover. Seal portion 41 fits smoothly slidably between stem 33 and cover opening surface 36.

The seal element 39 is biased axially outwardly of the assembly by spring 45 acting through thrust ring 42. The outer end of ring 42 is formed with an inclined annular surface 56 that intersects the inner cylindrical periphery 57 in an annular sharp edge 58. Engagement between ring 42 and seal element 39 takes place in a substantially line contact annular zone between edge 58 and surface 51 near the inner end of seal element 39.

As shown, surface 37 extends inwardly from juncture 55 at a greater angle with respect to the axis of stem 33 than seal surface 49. In the preferred embodiment the surface 37 may extend at 45° to the axis of stem 33. Similarly ring surface 56 extends from edge 58 at a greater angle with respect to the axis of stem 33 than seal surface 51, and this angle of surface 56 may also be 45° in the preferred embodiment. The inner surface 59 of ring 42 engaged by spring 45 is preferably flat and normal to the axis of the coaxial stem, seal and thrust ring.

FIGS. 7 and 8 illustrate a preferred method of forming a seal element 39. A section 61 of thin-walled hollow synthetic plastic tubing is slidably mounted upon a smooth cylindrical mandrel 62 having the same diameter as valve stem 33, the inner diameter of the tubing corresponding to the outer diameter of the mandrel, so that during forming as will appear there is substantially no inward radial deformation of the tube.

In a specific structure where the valve stem is about one-half inch in diameter, the mandrel 62 is the same diameter and the inner diameter of tube 61 slidably fits on the mandrel. The outer diameter of tube 61 is about five-eighths inch so that the wall is about one-sixteenth inch thick. Thus the seal element is thin-walled as compared to its length, this contributing to the spring action of the expanded portion 47 in the assembly.

Dies 63 and 64 slidably surround mandrel 62 at opposite ends of tubing 61, and the dies are movable between the open position shown in FIG. 7 and the closed forming position of FIG. 8.

Die 63 on the end facing tubing 61 has an inclined coaxial conical surface 65 that at its inner end intersects a cylindrical surface 66 of larger diameter than the internal die surface 67 that slides on mandrel 62 but of slightly smaller diameter than the outside diameter of tubing 61. A flat radial surface 68 connects surfaces 66 and 67, and defines an end abutment during the forming action as will appear. Preferably the die recess 69 defined by surfaces 68 and 66 is of the required size, both diametrically and lengthwise, of the reduced thickness cylindrical end portion 41 of the seal element. The inner end of die 63 terminates in a flat face 71 normal to the axis of mandrel 62.

Die 64 on the end facing tubing 61 has an inclined forming surface 72 that at its inner end intersects an axially short relatively shallow relief recess 73 surrounding the mandrel. Die 64 has a cylindrical inner periphery 74 slidably mounting it on mandrel 62, and a flat end face 75 normal to the mandrel axis.

In the preferred embodiment die surfaces 65 and 72 are disposed at 45° to the axis of mandrel 62.

When dies 63 and 64 are brought together to the forming position shown in FIG. 8, with end faces 71 and 75 abutting, the tubing 61 is formed, usually cold formed, into the seal element as shown in FIG. 8. One end of the tubing enters and occupies recess 69 with the inner periphery of the tubing at that end closely surrounding mandrel 62 to form surface 52 of the final seal element, and an intermediate portion near the other end is axially shortened, radially expanded and formed to a substantially V-shaped cross section wherein external surfaces 49' and 51' assume the 45° slope of die surfaces 65 and 72 respectively while in the die assembly. During this expansion of the intermediate portion of the tube the material of the tube wall undergoes both elastic and plastic deformation and this deformation is substantially retained when the dies are separated. However, due to the inherent resiliency of the plastic and the hoop stresses built into the expanded section, when the dies are moved back to open condition the released formed seal element 39' will tend to elastically recover toward its original condition. This recovery is limited by the plastic deformation which has taken place but it is sufficient to result in surfaces 49' and 51' assuming a less steep angle relative to the axis. In fact where the forming surface angle is 45° in the preferred embodiment, the released element has been found to assume slopes of approximately 55° at the external surfaces as shown and described for FIG. 6.

During the forming action the tubing will assume and maintain internal close contact with the mandrel at opposite ends, with the intermediate portion expanding laterally outwardly to engage die surfaces 65 and 72, the distance $d$ in FIG. 8 being less than the axial length of tubing 61. The recess 73, during the forming action permits initial entry of some plastic as the dies approach each other and provides an effective anchoring and turning region wherein the end face 76 of tubing 61 may be turned into engagement with the mandrel surface to eventually provide cylindrical surface 53 in the finished seal. There may be some extrusion into recess 73 forming a lip around the seal at that end and this may be removed if desired.

The foregoing method of forming the integral seal element 39 is particularly advantageous in that it produces a seal element wherein stresses are introduced that continuously aid the sealing action. The expanded intermediate section 47 of the seal element has incorporated therearound circumferential hoop stresses that in the assembly tend to return the element toward its original condition, and in the assembly these hoop stress act to reduce the effective diameter of the seal element and thereby increase the sealing engagement between stem 33 and the seal element surface at 53 which is the primary seal around the stem. The seal element surface at 52 provides an effective secondary seal.

Thus, in the assembly of FIG. 1, the cylindrical portion 41 of seal element 39 provides a radial bearing for supporting the valve stem in the cover and seal element 39 has good sealing engagement with stem 33 by virtue of the built-in hoop stresses at the expanded portion 47. Spring 45 continually biases the seal element outwardly, and the opposed forces provided by the cover 29 and the spring biased ring 42 acting axially of the seal element further tend to reduce the internal diameters of the seal surfaces surrounding the stem and thereby intensify the sealing at those areas. Wear of the seal at these areas is automatically taken up and compensated by the bias of preload spring 45.

The cover and spring biased thrust ring maintain annular seal pressure at edges 54, 55 to seal against pressure escaping along surface 48 and the seal zone at these edges is made wider and more effective by the action of any line fluid pressure in space 28. Increased fluid pressure in space 28 will result in seal surface 49 rocking about edge 55 to increase the width of its engagement with cover surface 37.

The seal is sensitized by the limited contact area caused by the elastic spring back of the formed seal element that creates a differential contact angle between seal element and cover. The inclination of surfaces 37 and 56 corresponds preferably to that of the inclined forming die surfaces. Because this contact area starts with a theoretical line contact at edge 55 that has minimum area it requires only slight vertical loading by spring 45 to achieve sealing stress and a wider seal zone. The differential area that exists between the stem seal and the cover seal is acted upon by the fluid pressure to be sealed and creates a vertical load on the seal element proportional to the pressure magnitude. The cover contact area at 55 will respond to changes in pressure by corresponding changes in contact area that will tend to maintain the necessary contact stress level to seal. The line or vessel pressure will also act on the outside diameter of the seal element between the points of stem and cover seal to tend to decrease the expanded diameter of the seal. The reaction of this pressure load is taken at the cover and stem contact areas creating a tighter seal.

The invention incorporated in a valve assembly has been found to provide a more efficient seal at temperatures ranging between —40° and 350° F. in tests involving 20,000 operating cycles. A comparison of the seal of the invention with hitherto used chevron V-section seal ring assemblies shows longer life, up to 300 percent longer; reduced cost, up to half, and less sensitivity to damage during installation and operation.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A seal assembly for a rotatable shaft extending through an opening in a relatively stationary part comprising an integral tubular plastic element having from end to end a wall thickness that is minor as compared to its length and an internal sealing surface sealingly and relatively rotatably surrounding said shaft, said element having a substantially radially expanded annular prestressed region along its length spaced from said shaft and having incorporated built-in circumferential hoop stresses that in the assembly continuously act to increase the sealing pressure at said surface in the assembly.

2. The seal assembly defined in claim 1, comprising means for resiliently biasing said element axially of said shaft into an annular zone of sealing engagement with said part around said opening.

3. The seal assembly defined in claim 2, wherein said prestressed region comprises angularly converging walls of said element that intersect laterally outwardly of said shaft.

4. The seal assembly defined in claim 3, where said stressed region is axially subjected to resilient means biasing it toward an annular zone of engagement with said part around said opening.

5. The seal assembly defined in claim 3, wherein said part is a wall confining fluid pressure to which said seal element is exposed to exert a force in the direction of said resilient means.

6. The seal assembly defined in claim 2, wherein said seal element comprises an annular portion at one end for extending within said opening to provide a radial bearing for said shaft and said annular sealing zone is disposed axially between said annular portion and said prestressed region.

7. The seal assembly defined in claim 6, wherein said annular portion is cylindrical and of less radial wall thickness than the remainder of said element.

8. A seal assembly for a rotatable shaft extending through an opening in a relatively stationary part comprising an integral thin-walled tubular plastic element having a wall thickness that from end to end is minor as compared to its length and two axially spaced annular internal surfaces surrounding and relatively rotatably engaging said shaft with at least one of said surfaces providing a seal around said shaft, said element having a radially expanded annular prestressed region having built-in circumferential hoop stresses disposed axially between said surfaces and comprising annular walls extending angularly outwardly with respect to said surfaces and converging to intersect radially outwardly of said shaft, and means for axially biasing said element into sealing contact with said stationary part around an annular zone at said opening.

9. In the seal assembly defined in claim 8, said element comprising a tubular extension at one end projecting into said opening and formed with one of said surfaces to provide radial bearing of the shaft in said part, and said annular zone being disposed at the juncture of said tubular extension with the adjacent angularly extending annular wall.

* * * * *